US010248854B2

(12) United States Patent
Ming et al.

(10) Patent No.: US 10,248,854 B2
(45) Date of Patent: Apr. 2, 2019

(54) HAND MOTION IDENTIFICATION METHOD AND APPARATUS

(71) Applicants: Beijing University of Posts and Telecommunications, Beijing (CN); TENCENT TECHNOLOGY (SHENZHEN) COMPANY LIMITED, Shenzhen (CN)

(72) Inventors: Yue Ming, Beijing (CN); Jie Jiang, Beijing (CN); TingTing Liu, Beijing (CN); Juhong Wang, Beijing (CN)

(73) Assignees: BEIJING UNIVERSITY OF POSTS AND TELECOMMUNICATIONS, Beijing (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 126 days.

(21) Appl. No.: 15/111,419

(22) PCT Filed: Apr. 21, 2015

(86) PCT No.: PCT/CN2015/077052
§ 371 (c)(1),
(2) Date: Jul. 13, 2016

(87) PCT Pub. No.: WO2015/161776
PCT Pub. Date: Oct. 29, 2015

(65) Prior Publication Data
US 2016/0335487 A1 Nov. 17, 2016

(30) Foreign Application Priority Data

Apr. 22, 2014 (CN) .......................... 2014 1 0163979

(51) Int. Cl.
*G06K 9/00* (2006.01)
*G06K 9/46* (2006.01)

(52) U.S. Cl.
CPC ..... *G06K 9/00355* (2013.01); *G06K 9/00201* (2013.01); *G06K 9/00335* (2013.01); *G06K 9/00744* (2013.01); *G06K 9/4671* (2013.01)

(58) Field of Classification Search
CPC ........... G06K 9/00355; G06K 9/00201; G06K 9/00335; G06K 9/00744; G06K 9/4671
(Continued)

(56) References Cited

U.S. PATENT DOCUMENTS

2008/0094389 A1* 4/2008 Rouet .................. G06K 9/0014
345/419
2013/0250050 A1* 9/2013 Kanaujia ............ H04N 13/0007
348/42
(Continued)

FOREIGN PATENT DOCUMENTS

CN 101882000 A 11/2010
CN 102479388 A 5/2012
(Continued)

OTHER PUBLICATIONS

The World Intellectual Property Organization (WIPO) International Search Report for PCT/CN2015/077052 dated Jul. 16, 2015 p. 1-3.
(Continued)

*Primary Examiner* — Zaihan Jiang
(74) *Attorney, Agent, or Firm* — Anova Law Group, PLLC

(57) ABSTRACT

A hand motion identification method includes: obtaining a to-be-identified video; performing area-locating and tracking of a hand for the to-be-identified video, and extracting a red-green-blue (RGB) video and a depth information video of the hand; detecting the RGB video and the depth infor-
(Continued)

mation video of the hand, to obtain a feature point; representing the feature point by using a 3D Mesh motion scale-invariant feature transform (MoSIFT) feature descriptor; and comparing the 3D Mesh MoSIFT feature descriptor of the feature point with a 3D Mesh MoSIFT feature descriptor in a positive sample obtained through beforehand training, to obtain a hand motion category in the to-be-identified video.

18 Claims, 5 Drawing Sheets

(58) Field of Classification Search
USPC ......................................................... 348/135
See application file for complete search history.

(56) References Cited

U.S. PATENT DOCUMENTS

| | | | | |
|---|---|---|---|---|
| 2013/0300900 | A1* | 11/2013 | Pfister | G06K 9/00315 348/239 |
| 2013/0335318 | A1* | 12/2013 | Nagel | G06F 3/017 345/156 |
| 2014/0168217 | A1* | 6/2014 | Kim | G06T 13/40 345/420 |
| 2014/0267031 | A1* | 9/2014 | Huebner | G06F 3/0346 345/158 |
| 2015/0009123 | A1* | 1/2015 | Kim | G06K 9/00208 345/156 |
| 2015/0134095 | A1* | 5/2015 | Hemani | G06T 19/00 700/98 |
| 2015/0138078 | A1* | 5/2015 | Krupka | G06K 9/00389 345/156 |
| 2015/0213244 | A1* | 7/2015 | Lymberopoulos | G06F 21/32 726/18 |
| 2016/0000518 | A1* | 1/2016 | Thoranaghatte | A61B 19/5244 703/11 |
| 2016/0048161 | A1* | 2/2016 | Carceroni | G06F 1/163 361/679.03 |
| 2016/0283774 | A1* | 9/2016 | Buchanan | G06K 9/0063 |

FOREIGN PATENT DOCUMENTS

| | | |
|---|---|---|
| CN | 102968643 A | 3/2013 |
| CN | 103295016 A | 9/2013 |
| CN | 103473530 A | 12/2013 |
| CN | 103479367 A | 1/2014 |

OTHER PUBLICATIONS

Yue Ming, Hand Fine-Motion Recognition Based on 3D Mesh Mosift Feature Descriptor, Neurocomputing, Nov. 11, 2014, p. 574-582,vol. 151, Elsevier.

The State Intellectual Property Office of the People's Republic of China (SIPO) Office Action 1 for 201410163979.4 dated Oct. 8, 2018 13 Pages (including translation).

Yuan Yao, et al.; "Hand Part Labeling and Gesture Recognition from RGB-D Data", Journal of Computer-Aided Design & Computer Graphics, vol. 25 No. 12, Dec. 2013 (Dec. 31, 2013), p. 1810-1815. 8 Pages.

Yueming Wang, et al.; "A survey of 3D Face Recognition", Journal of Computer-Aided Design & Computer Graphics, vol. 20, No. 7. Jul. 2008 (Jul. 31, 2008), p. 821-826. 11 Pages.

* cited by examiner

HAND MOTION IDENTIFICATION METHOD AND APPARATUS

CROSS-REFERENCES TO RELATED APPLICATIONS

This application claims priority of PCT Patent Application No. PCT/CN2015/077052, filed on Apr. 21, 2015, which claims priority of Chinese Patent Application No. 201410163979.4, entitled "HAND MOTION IDENTIFICATION METHOD AND APPARATUS," filed on Apr. 22, 2014, the entire contents of both of which are incorporated herein by reference.

FIELD OF THE TECHNOLOGY

The present disclosure relates to the motion identification field, and in particular, to a hand motion identification method and apparatus.

BACKGROUND OF THE DISCLOSURE

With development of computer technologies, human behavior identification is a field that continuously develops in computer vision, and particularly develops with the big data era. Recently, an increasing quantity of studies focus on group behavior identification, for example, supervised learning behavior identification for a feature-based covariance matrix, which has a powerful anti-mutation behavior, viewpoint switching, and a low resolution, and for another example, a behavior that simulates a complex time space interaction by using an interval Bayesian network, an original motion event of unsupervised grouping and one-time learning that are based on a unified framework of human behavior, posture, and facial expression, and the like. The foregoing behavior analyses are all applied to analyzing a large quantity of behaviors of an individual or a group.

Due to variations of light, posture, and occlusion, hand motions cannot be accurately identified.

SUMMARY

Based on this, it is necessary to provide, for a problem that a hand motion cannot be correctly identified, a hand motion identification method and apparatus, which can correctly identify a hand motion.

A hand motion identification method includes the following steps: obtaining a to-be-identified video; performing area localization and tracking of a hand for the to-be-identified video, and extracting a red-green-blue (RGB) video and a depth information video of the hand; detecting the RGB video and the depth information video of the hand, to obtain a feature point; representing the feature point by using a 3D Mesh motion scale-invariant feature transform (MoSIFT) feature descriptor; and comparing the 3D Mesh MoSIFT feature descriptor of the feature point with 3D Mesh MoSIFT feature descriptors in positive samples obtained through beforehand training, to obtain a hand motion category in the to-be-identified video.

A hand motion identification apparatus, including: a to-be-identified video obtaining module, configured to obtain a to-be-identified video; a to-be-identified video pair extraction module, configured to perform area localization and tracking of a hand for the to-be-identified video, and extract an RGB video and a depth information video of the hand; a to-be-identified feature point detection module, configured to detect the RGB video and the depth information video of the hand, to obtain a feature point; a to-be-identified feature point representation module, configured to represent the feature point by using a 3D Mesh MoSIFT feature descriptor; and a category identification module, configured to compare the 3D Mesh MoSIFT feature descriptor of the feature point with 3D Mesh MoSIFT feature descriptors in positive samples obtained through beforehand training, to obtain a hand motion category in the to-be-identified video.

In the foregoing hand motion identification method and apparatus, an RGB video and a depth information video of a hand are extracted from a video, the RGB video and the depth information video are detected to obtain a feature point, the feature point is described by using a 3D Mesh MoSIFT feature descriptor, and the feature point is determined to obtain a hand motion category. The extraction by using the feature point includes depth information, greatly improving the hand identification accuracy, and the feature point can be accurately described by using the 3D Mesh MoSIFT feature descriptor, further improving the hand motion identification accuracy.

Other aspects of the present disclosure can be understood by those skilled in the art in light of the description, the claims, and the drawings of the present disclosure.

DESCRIPTION OF EMBODIMENTS

To make the purpose, the technical solutions, and the advantages of the present disclosure clearer, the following further describes the present disclosure in detail with reference to the accompanying drawings and embodiments. It should be understood that, the specific embodiments described herein are only used to explain the present disclosure, but are not used to limit the present disclosure.

The method disclosed as following may be implemented by any appropriate computing device having one or more processors and a memory. The computing device used herein may refer to any appropriate device with certain computing capabilities (for example, of controlling media data to be placed at a constant speed), such as a personal computer (PC), a work station computer, a hand-held computing device (tablet), a mobile terminal (a mobile phone or a smart phone), a server, a network server, a smart terminal, or any other user-side or server-side computing device. The memory includes a storage medium, which may further include memory modules, for example, read-only memory (ROM), random access memory (RAM), and flash memory modules, and mass storages, for example, CD-ROM, U-disk, removable hard disk, and the like, which are all non-transitory storage mediums. The storage medium may store computer programs for implementing various processes, when executed by the processors.

Figure 1:
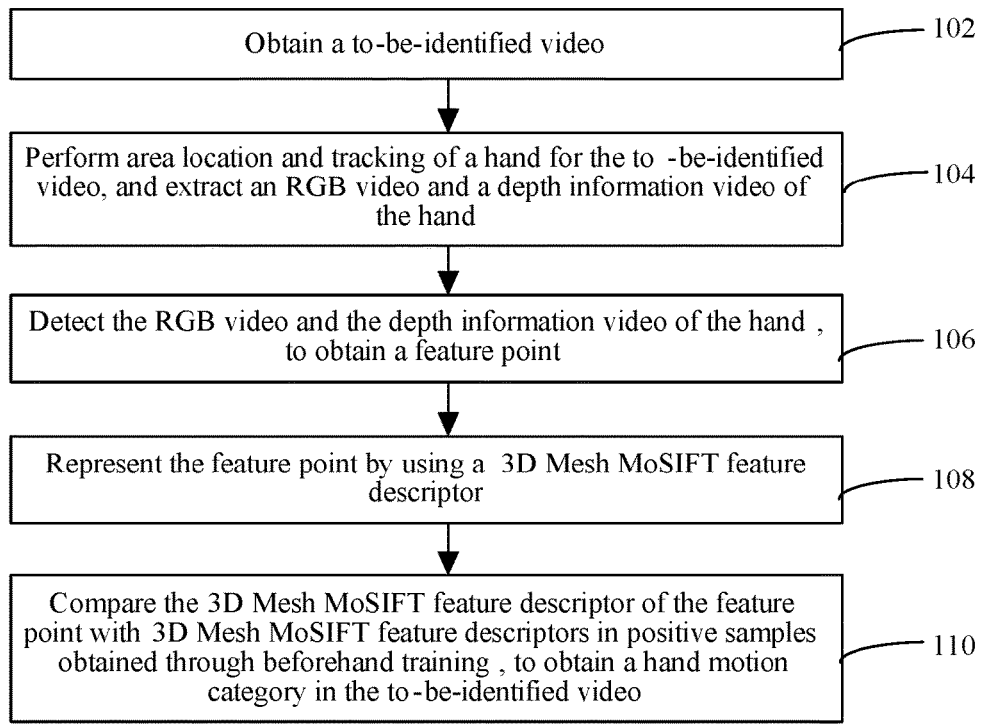
FIG. 1 is a flowchart of a hand motion identification method according to an embodiment.

FIG. 1 is a flowchart of a hand motion identification method according to an embodiment. As shown in FIG. 1, the hand motion identification method includes the following steps.

Step 102: Obtaining a to-be-identified video.

Specifically, the to-be-identified video may be various collected RGB videos and depth information videos that include human hand motion data. Depth information refers to a normal line distance from an object point to a camera focal point in a scenario, that is, a pixel depth value. A matrix formed by depth values of all pixels is a depth map of the image. The depth information is affected by factors such as lighting, posture, and blocking (i.e., occlusion). The depth information is captured by using a motion sensing camera to receive an infrared signal, and can effectively reflect a change tendency of a distance between a motion area and the camera.

Step 104: Performing area localization and tracking of a hand for the to-be-identified video, and extracting an RGB video and a depth information video of the hand.

Specifically, a hand area in each frame of image in the to-be-identified video is located and tracked by using an automatic detector, and then an RGB-Depth (D) video pair (that is, a pair of the RGB video and the depth information video) of the hand is extracted. The automatic detector has 21 degrees of freedom for 21 joint angles and 6 degrees of freedom for orientation and location.

Step 106: Detecting the RGB video and the depth information video of the hand, to obtain a feature point.

Specifically, the feature point refers to a local extremum of a grayscale change in a video image, and includes all particular structural information of a video. In this embodiment, the feature point can represent a structural feature of the RGB video and the depth information video of the hand.

Step 108: Representing the feature point by using a 3D Mesh MoSIFT feature descriptor.

Specifically, the English corresponding to the 3D Mesh MoSIFT feature descriptor is 3D Mesh motion scale-invariant feature transform feature descriptor. The 3D Mesh MoSIFT feature descriptor is an image local feature description operator that is based on a scale space and keeps image zoom and rotation transformation unchanged. In this embodiment, the feature point of the RGB-D video pair of the hand is represented by using the 3D Mesh MoSIFT feature descriptor.

Step 110: Comparing the 3D Mesh MoSIFT feature descriptor of the feature point with 3D Mesh MoSIFT feature descriptors in positive samples obtained through beforehand training, to obtain a hand motion category in the to-be-identified video.

Specifically, training is performed according to videos of known hand motion categories to obtain positive and negative samples, where the positive sample refers to a sample in which hand motion is correctly identified, and the negative sample refers to a sample in which hand motion is incorrectly identified. The positive sample includes the 3D Mesh MoSIFT feature descriptor and a corresponding hand motion category. The 3D Mesh MoSIFT feature descriptor of the feature point of the RGB-D video pair of the hand in the to-be-identified video is matched with the 3D Mesh MoSIFT feature descriptors in the positive samples, so that the hand motion category in the to-be-identified video may be obtained.

In the foregoing hand motion identification method and apparatus, an RGB video and a depth information video of a hand are extracted from a video, the RGB video and the depth information video are detected to obtain a feature point, the feature point is described by using a 3D Mesh MoSIFT feature descriptor, and the 3D Mesh MoSIFT feature descriptor of the feature point is matched with the 3D Mesh MoSIFT feature descriptor in the positive sample, so that the hand motion category in the to-be-identified video may be obtained. The extraction by using the feature point includes depth information, greatly improving the hand identification accuracy, and the feature point can be accurately described by using the 3D Mesh MoSIFT feature descriptor, further improving the hand motion identification accuracy.

In an embodiment, the step 104 of performing area localization and tracking of a hand for the to-be-identified video, and extracting an RGB video and a depth information video of the hand includes: locating a hand area by using an adaptive window; and tracking the hand area of a current frame by using a minimized energy function in combination with hand state prediction of a previous frame, and extracting the RGB video and the depth information video of the hand.

Specifically, a frame of to-be-identified video data is first selected, and a hand area of the selected frame of to-be-identified video data is located by using an adaptive window. Then, the hand area of a current frame is tracked by using a minimized energy function in combination with hand state prediction of a previous frame, and the RGB video and the depth information video of the hand are extracted. The location and tracking of the hand area can effectively predict a change of a state with a change of time.

The minimized energy function is a sum of a data term, a smoothness term, a distance term, a space constraint, a motion constraint, and a Chamfer distance term. A formula of the minimized energy function is as follows:

$$E(\lambda,i)=E_D(\lambda,i)+E_S(\lambda,i)+E_T(\lambda,i)+E_C(\lambda,i)+E_M(\lambda,i)+E_{Ch}(\lambda,i) \quad (1)$$

In the formula (1), $E(\lambda,i)$ is an energy function of an $i^{th}$ frame under parameter $\lambda$, $\lambda$ is an annotation function, $E_D(\lambda,i)$ is the data term, $E_S(\lambda,i)$ is the smoothness term, $E_T(\lambda,i)$ is the distance term, $E_C(\lambda,i)$ is the space constraint, $E_M(\lambda,i)$ is the motion constraint, and $E_{Ch}(\lambda,i)$ is the Chamfer distance term.

The data term $E_D(\lambda,i)$ is used to estimate likelihood values of the hand at pixels. It is assumed that, hand $o_n^i$ is fixed on the $i^{th}$ frame of video of the selected RGB-D video pair, $o_n^i$ indicates an $n^{th}$ hand on the $i^{th}$ frame, $o_0^i$ indicates a background of the RGB-D video pair; and herein, n=1, 2, . . . , N indicates that there are a total of N hands (each frame of one video pair may include motions of multiple hands, and it needs to separately estimate, for each hand, likelihood values of each hand at pixels), and then $O_n^{i+1|i}$ of an $(i+1)^{th}$ frame may be predicted according to $o_n^i$ of the $i^{th}$ frame ($O_n^{i+1|i}$ indicates a hand on the $(i+1)^{th}$ frame for the $n^{th}$ hand of the $i^{th}$ frame). The data term $E_D(\lambda,i)$ is obtained through a calculation by using a logarithmic function and a binary function. The data term $E_D(\lambda,i)$ is defined as follows:

$$E_D(\lambda, i) = -\sum_{x \in I} \sum_{n=0}^{N} \ln(p_n^i(x)) \delta(\lambda, n) \quad (2)$$

The data term $E_D$ estimates likelihood value $P_n(X)$ of target n on pixel x; $\delta(\lambda, n)$ is the binary function, where if $\lambda=n$, $\delta(\lambda, n)=1$, and otherwise, $\delta(\lambda, n)=0$; N is a total quantity of hands; x is a pixel; and I is a pixel set on the $i^{th}$ frame.

The smoothness term $E_S(\lambda,i)$ is used to estimate smoothness of two adjacent pixels p,q. The smoothness term $E_S(\lambda,i)$ is obtained through a calculation by using a smoothness parameter, a camera noise, a Euclidean distance between the two adjacent pixels, and the binary function. A formula for calculating the smoothness term $E_S(\lambda,i)$ is as follows:

$$E_S(\lambda, i) = w_s \sum_{(p,q) \in w', \lambda_p \neq \lambda_q} \left(\exp(-(I_p^i(x) - I_q^i(x))^2 / \sigma^2) * (1 / \|p - q\|)\right) \quad (3)$$
$$(1 - \delta(\lambda_p, \lambda_q))$$

In the formula (3), $\|p-q\|$ is a standard Euclidean distance, $\sigma$ is the estimated camera noise, $w_s > 0$ indicates the smoothness parameter, and w' is all pairs of unordered neighborhood pixel in standard four neighborhoods. $\delta(\lambda_p, \lambda_q)$ is the binary function, where if p,q are consistent, $\delta(\lambda_p, \lambda_q)=1$, and if p,q are inconsistent, $\delta(\lambda_p, \lambda_q)=0$; $I_p^i(x)$ indicates a grayscale value of pixel p on the $i^{th}$ frame, and $I_q^i(x)$ indicates a grayscale value of pixel q on the $i^{th}$ frame.

The distance term $E_T(\lambda,i)$ is used to constrain a new state estimation to be within a predicted space domain. The distance term $E_T(\lambda,i)$ is applicable to a target that is continuously transformed in time and space. The distance term $E_T(\lambda,i)$ is obtained through a calculation by using a distance parameter and a scale function. The distance term $E_T(\lambda,i)$ is defined as follows:

$$E_T(\lambda, i) = w_T \sum_{x \in I} \sum_{n=1}^{N} \alpha(\tilde{c}_n - c_n) d_n(I(x)) \delta(\lambda(x), n) \quad (4)$$

In the formula (4), $\tilde{c}_n$ is predicted center of gravity; $c_n$ is an actual center of gravity; $w_T > 0$ indicates the distance parameter; $\alpha(\tilde{c}_n - c_n)$ is the scale function; N a total quantity of hands; x a pixel; I is a pixel set on the $i^{th}$ frame; I(x) is a grayscale value of pixel x; distance $$d_n(I(x)) = \min_{z \in o_n^{i+1|i}} \|I(x) - z\|$$

is used to constrain a new state to be within a predicted space domain, where z is an empirical value; and $\delta(\lambda(x), n)$ is the binary function, where if $\lambda(x)=n$, $\delta(\lambda(x), n)=1$, and otherwise, $\delta(\lambda(x), n)=0$.

The space constraint $E_C(\lambda,i)$ is used to distinguish a color-similar area of the hand. Skin colors of human bodies are similar, and therefore a space constraint is introduced to distinguish the color-similar area of the hand. The space constraint $E_C(\lambda,i)$ calculates a distance between pixel x and center of gravity (a center of gravity of a hand on the $i^{th}$ frame for the $n^{th}$ hand of the $(i+1)^{th}$ frame) of $o_n^{i|i-1}$ (a hand on the $i^{th}$ frame for the $n^{th}$ hand of the $(i+1)^{th}$ frame). When pixel x is close to the center of gravity $c_n^{i|i-1}$, a penalty for $E_C(\lambda,i)$ is small. The space constraint $E_C(\lambda,i)$ is obtained through a calculation by using a penalty function and a binary function. The space constraint $E_C(\lambda,i)$ is defined as follows:

$$E_c(\lambda, i) = w_c \sum_{x \in I} \sum_{n=1}^{N} \psi(I(x), c_n^{i|i-1}) \delta(\lambda(x), n) \quad (5)$$

In the formula (5), $c_n^{i|i-1}$ indicates a center of gravity of prediction set $o_n^{i|i-1}$; $w_c > 0$ is a constant; I is a pixel set on the $i^{th}$ frame; and $\delta(\lambda(x), n)$ is the binary function, where if $\lambda(x)=n$, $\delta(\lambda(x), n)=1$, and otherwise, $\delta(\lambda(x), n)=0$. The penalty function is as follows:

$$\psi(x, c_n^{i|i-1}) = \exp\left(\|x - c_n^{i|i-1}\| / \sum_{n=1}^{N} \|x - c_n^{i|i-1}\|\right) \quad (6)$$

In the formula (6), $\|x-c_n^{i|i-1}\|$ indicates a standard Euclidean distance between pixel x and $c_n^{i|i-1}$ of $o_n^{i|i-1}$.

The motion constraint $E_M(\lambda,i)$ is used to separate the hand from another portion other than the hand. To overcome blocking of the hand by another object (such as a human face) with a similar color, the motion constraint $E_M(\lambda,i)$ is introduced to obtain good separation. The motion constraint $E_M(\lambda,i)$ is obtained through a calculation by using a weight parameter and an average rate. The motion constraint $E_M(\lambda,i)$ is defined as follows:

$$E_M(\lambda, i) = \quad (7)$$
$$w_M \sum_{x \in I} \sum_{n=1}^{N} \beta_1(\bar{v}_n^j) \delta(\lambda(x), n) - w_M \sum_{x \in I} \beta_2(\bar{v}_1^0 \ldots \bar{v}_N^0)(1 - \delta(\lambda(x), 0))$$

In the formula (7), $w_M > 0$ is the weight parameter, and $\bar{v}_n^i$ is an average rate of the $n^{th}$ hand of the $i^{th}$ frame. Functions $\beta_1(\bar{v}_n^i)$ and $\beta_2(\bar{v}_1^i \ldots \bar{v}_N^i)$ are defined as follows:

$$\beta_1(\bar{v}_n^j) = \exp(-\bar{v}_n^j * \bar{v}_n^j / \rho^2) \quad (8)$$

$$\beta_2(\bar{v}_1^0 \ldots \bar{v}_N^0) = \exp\left(-\sum_{n=1}^{N} \bar{v}_n^0 * \bar{v}_n^0 / \rho^2\right)$$

In the formula (8), $\rho$ is a motion parameter. Pixel x is taken from prediction set $o_n^{i|i-1}$, $n_1$ hands are allocated to $\beta_1$, and remaining $n_2$ hands are allocated to $\beta_2$.

The Chamfer distance term $E_{Ch}(\lambda,i)$ is used to distinguish an overlapping area of the hand. When two hands are overlapped, a large Chamfer value needs to be set to ensure the blocked area prediction accuracy. The Chamfer distance term $E_{Ch}(\lambda,i)$ is obtained through a calculation by using the weight parameter and a distance change function. The Chamfer distance term $E_{Ch}(\lambda,i)$ is obtained through a calculation by using the following equation:

$$E_{Ch}(\lambda, i) = w_{Ch} \sum_{(p,q)\in w^t, \lambda_p \neq \lambda_q} (1 - \exp(-\xi(x)))(1 - \delta(\lambda_p, \lambda_q)) \quad (9)$$

In the formula (9), $\xi(x)$ is the Chamfer distance change function, which is normalized within [0, 1]; $w_{Ch}>0$ is the weight parameter; $w^t$ is a moment weight value, where if p,q are consistent, $\delta(\lambda_p, \lambda^q)=1$, and if p,q are inconsistent, $\delta(\lambda_p, \lambda_q)=0$. Before a Chamfer distance is calculated, a binary image of the $i^{th}$ frame is first obtained, and then a value of the Chamfer distance is calculated in an inter-frame manner.

Figure 2:
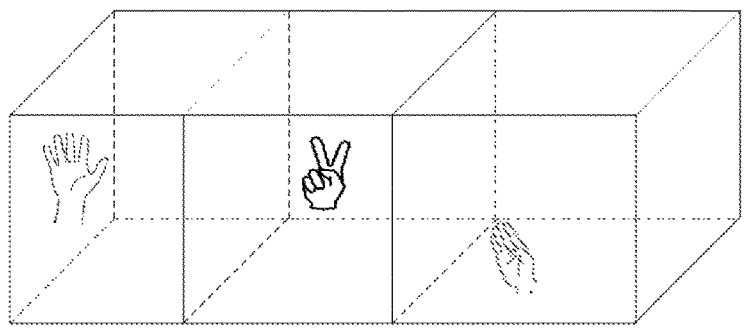
FIG. 2 is a schematic diagram of an instance of hand location and tracking for different distances.

All terms are combined, a chart is formed by using the prediction set and an extension term, and a final tracking result is obtained according to this chart. As shown in FIG. 2, FIG. 2 shows a schematic diagram of an instance of hand location and tracking for different distances.

In an embodiment, the step 106 of detecting the RGB video and the depth information video of the hand, to obtain a feature point includes the following.

(1) Converting the RGB video and the depth information video of the hand into grayscale and depth data, and convert the grayscale and depth data into 3D grid data.

(2) Calculating a local density of depth information of vertices within a preset neighborhood in the 3D grid data.

Specifically, grid domain M is formed by using the 3D grid data. A Gauss filter is defined on grid domain M, to obtain grid layer $M^s=(V^s, F)$, where $V^s$ is a vertex at a layer S, and F is a triangular patch.

It is assumed that, for each vertex $\upsilon_m^s$ at layer S (a layer is a scale) of the grid layer, vertex $\upsilon_m^{s+1}$ of a next layer, that is, (S+1), is an average value of all vertices within a first order neighborhood of $\upsilon_m^s$. $\upsilon_m^{s+1}$ may be calculated according to a formula (10):

$$\upsilon_m^{s+1} = \frac{1}{Vn_m^s} \sum_{\upsilon_j^s \in Vn_m^s} \upsilon_j^s \quad (10)$$

In the formula (10), $Vn_m^s$ is a first order neighborhood set of $\upsilon_m^s$, and $\upsilon_j^s$ is an element in $Vn_m^s$. $D_i$ is defined as the local density of the depth information at vertex $\upsilon_m^s$, and a calculation formula of it is a formula (11):

$$D_i = \frac{1}{|Vn_m^s|} \sum_{\upsilon_j^s \in Vn_m^s} |\upsilon_m^s - \upsilon_j^s| \quad (11)$$

An initial variance $\sigma_0 = D_i$.

Different of gradient (DOG) function $d_m^s$ is defined as a variance of two Gaussian kernels at different scales, and is calculated according to a formula (12):

$$d_m^s = \frac{1}{\sigma^2} |\upsilon_m^s - \upsilon_m^{s+1}| \quad (12)$$

In the formula (12), $\sigma^2$ is a variance of the Gauss filter at scale S. A target grid sample is uneven, an overall filtration width of the grid layer meets density invariance $\sigma_s = \sqrt{s} D_m$, and $D_m$ is the local density of the depth information.

A local scale is set to $S_m = C\sqrt{S_m D_m}$, where $S_m$ is a scale parameter, $D_m$ is the local density of the depth information, C is a predefined parameter of a descriptor used to balance locality and robustness.

(3) Selecting a vertex corresponding to a maximum value of the local density of the depth information within the preset neighborhood, to be used as a feature point of the preset neighborhood.

In this embodiment, the preset neighborhood may include a 6-point neighborhood of this layer, a 6-point neighborhood of an upper layer, and a 6-point neighborhood of a lower layer. That is, a vertex at this layer is used as a center, 6 points are selected at this layer, 6 points are selected at the upper layer, and 6 points are selected at the lower layer, to form a neighborhood of the vertex. A range of the preset neighborhood may be adjusted as required, and is not limited.

In an embodiment, the step 108 of representing the feature point by using a 3D Mesh MoSIFT feature descriptor includes: representing the feature point by using a 3D gradient space descriptor and a 3D motion space descriptor, where the 3D gradient space descriptor includes image gradient descriptors in a horizontal direction and a vertical direction, and the 3D motion space descriptor is a rate descriptor.

Specifically, to reduce redundancy and improve calculation efficiency, based on 3D Mesh MoSIFT feature descriptors of three separated planes, only a case of co-occurrence is considered. The 3D Mesh MoSIFT feature descriptor of the feature point includes two portions: the 3D gradient space descriptor and the 3D motion space descriptor. The 3D gradient space descriptor includes the image gradient descriptors in the horizontal direction and the vertical direction.

Figure 3:
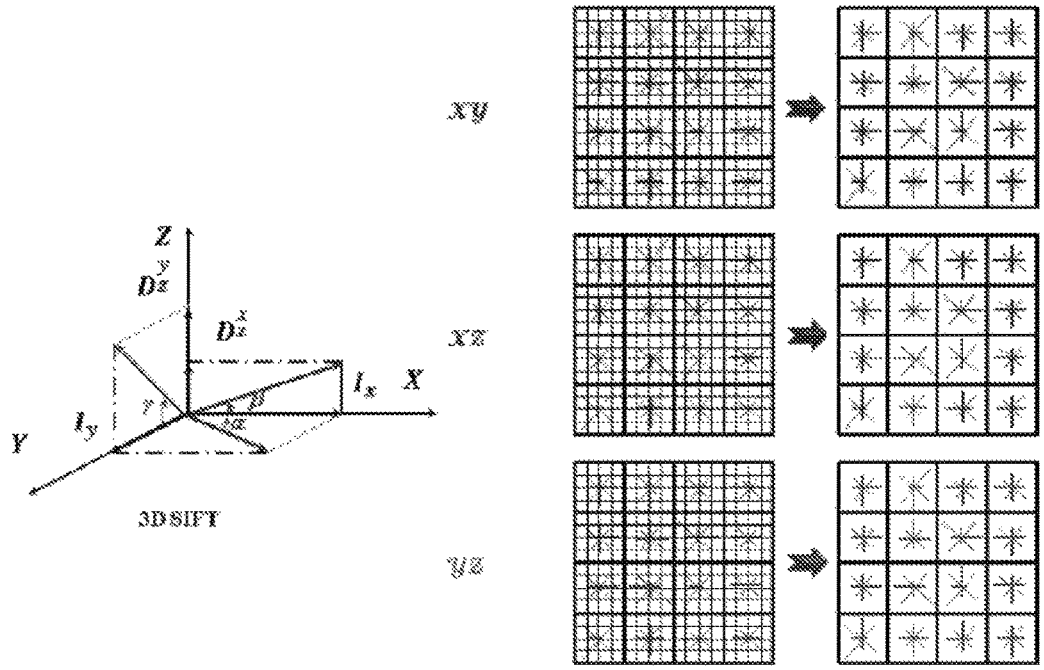
FIG. 3 is a schematic diagram of calculating a 3D Mesh MoSIFT feature descriptor.

The 3D gradient space descriptor is obtained through a calculation in the manner in FIG. 3. Steps for calculating the 3D gradient space descriptor are as follows: first rotating coordinate axes to a direction of the feature point, then projecting the feature point to an xy plane, an xz plane, and a yz plane of 3D space coordinates, separately taking m×m windows by using points formed by projecting the feature point to the xy plane, the xz plane, and the yz plane as centers, calculating, on each r×r block, gradient histograms in 8 directions, evaluating an accumulated value of each gradient direction, to form one seed point, and making up the feature point by using $$\frac{m}{r} \times \frac{m}{r}$$

seed points, where each seed point has vector information of 8 directions, and m and r are both a natural number that is an integer multiple of 2.

In this embodiment, 16×16 windows (for example, the left portion in FIG. 3) are separately taken by using points formed by projecting the feature point to the xy plane, the xz plane, and the yz plane as centers, where each window represents one pixel of a scale space in which a neighborhood of the feature point is located, and an arrow direction represents a gradient direction of this pixel, and an arrow length represents a gradient modulus value. Then, gradient direction histograms in 8 directions are calculated on each 4×4 block, then an accumulated value of each gradient direction is drawn, and then a seed point may be formed, as shown in the right portion in FIG. 3. One feature point in FIG. 3 consists of 4×4, that is, a total of 16, seed points, where each seed point has vector information of the 8 directions. 128 data may be generated by describing the feature point by using 16 seed points, finally forming a 3D Mesh MoSIFT feature vector with 128 dimensions, which has higher accuracy. In another embodiment, a size of a window taken by using points formed by projecting the feature point to the xy plane, the xz plane, and the yz plane as centers may be 8×8, and then one feature point consists of 2×2, that is, a total of 4 seed points, where each seed point has vector information of the 8 directions.

Image gradients in the horizontal direction and the vertical direction are calculated according to a formula (13):

$$I_x = \nabla_x(I) = \frac{\partial I}{\partial x}, I_y = \nabla_y(I) = \frac{\partial I}{\partial y},$$
$$D_z^x = \nabla_x(D) = \frac{\partial D}{\partial x}, D_z^y = \nabla_y(D) = \frac{\partial D}{\partial y} \quad (13)$$

In the formula (13), $$\frac{\partial D}{\partial x} \text{ and } \frac{\partial D}{\partial y}$$

are respectively gradients in an x direction (the horizontal direction) and a y direction (the vertical direction).

The 3D motion space descriptor is a rate descriptor. Components of the rate descriptor on 3D space x-, y-, and z-coordinate axes include: the component of the rate descriptor on the x-axis being a difference between coordinate values of the x-axis to which the feature point is projected on two adjacent frames of videos; the component of the rate descriptor on the y-axis being a difference between coordinate values of the y-axis to which the feature point is projected on two adjacent frames of videos; and the component of the rate descriptor on the z-axis being a difference between coordinate values of the z-axis to which the feature point is projected on depth information of two adjacent frames of videos.

Specifically, feature point $p_i$ at time point moment is detected, point $p_{i+1}$ may be predicted by using RGB data, and then corresponding $p_i^d$ and $p_{i+1}^d$ are determined in depth image D in the depth information video. A formula for calculating rates in different directions is a formula (14):

$$V_x = I_x(p_{i+1}) - I_x(p_i), V_y = I_y(p_{i+1}) - I_y(p_i), V_z = D(p_{i+1}) - D(p_i) \quad (14)$$

The foregoing represents the feature point by using the 3D Mesh MoSIFT feature descriptor, so that a motion surface result may be better reflected and more distinguishing information may be stored; and the 3D Mesh MoSIFT feature descriptor forms a mesh surface on three orthogonal planes of the xy plane, the xz plane, and the yz plane, and a connection feature vector is shorter, effectively improving information representation of a hand fine motion.

In an embodiment, the step 110 of comparing the 3D Mesh MoSIFT feature descriptor of the feature point with 3D Mesh MoSIFT feature descriptors in positive samples obtained through beforehand training, to obtain a hand motion category in the to-be-identified video includes the following steps.

(1) Dimensionally reducing the 3D Mesh MoSIFT feature descriptor of the feature point to a dimension that is the same as that of the 3D Mesh MoSIFT feature descriptor in a positive sample obtained through the beforehand training.

Specifically, it is assumed that $Y=[y_1, y_2, \ldots, y_n] \in R^{D \times N}$ is a group of descriptors of D dimensions that are extracted from a training video, for constructing a visual code book $B=[b_1, b_2, \ldots, b_M] \in R^{D \times M}$. Sparse table $C=[c_1, c_2, \ldots, c_N]$ is provided for Y, where $c_i \in R^M$, and each $c_i$ includes k (k□ M) or fewer non-zero elements. An optimization function is defined according to a formula (15):

$$\min_c \|Y - BC\|_F^2, \text{ s.t. } \|c_i\|_0 \le k, \forall i \quad (15)$$

In the formula (15), $\|.\|_F$ is a Forbenius norm, and $\|.\|_0$ is an $l_0$ norm, used to calculate the number of non-zero elements. The 3D Mesh MoSIFT feature descriptor of the feature point is dimensionally reduced, by using the formula (15), to a dimension that is the same as that of the 3D Mesh MoSIFT feature descriptor in the positive sample obtained through the beforehand training. In addition, a simulation orthogonal matching pursuit (SOMP) tracking sparse code method is used, to represent a sparse coefficient by using a linear combination.

For sparse coefficient $c_i \in C$ of a vector of a descriptor related to the hand motion category, each sparse coefficient is represented by using a coefficient histogram, and the formula is a formula (16):

$$h_j = \frac{1}{N} \sum_{i=1}^{N} c_i \quad (16)$$

In the formula (16), $c_i \in C$ is a descriptor of the $i^{th}$ frame of $C \in M \times N$, where N is a total quantity of $h_j \in M$ descriptors. Each visual code may be described by using the coefficient histogram, and visual code of a hand motion in a video may be visually determined and identified according to the coefficient histogram, thereby obtaining a result of a hand motion category.

(2) Evaluating a Euclidean distance between the 3D Mesh MoSIFT feature descriptor of the feature point after the dimension reduction and the 3D Mesh MoSIFT feature descriptor in the positive sample.

(3) Selecting a category corresponding to the 3D Mesh MoSIFT feature descriptor in one of the positive sample with a minimum Euclidean distance to the 3D Mesh MoSIFT feature descriptor of the feature point, to be used as the hand motion category in the to-be-identified video.

In the foregoing, the 3D Mesh MoSIFT feature descriptor of the feature point is dimensionally reduced, to reach a dimension of the 3D Mesh MoSIFT feature descriptor obtained through the beforehand training, and then comparison and matching are performed, which is more accurate.

In an embodiment, the foregoing hand motion identification method further includes: performing beforehand training, to obtain the positive sample that includes the 3D Mesh MoSIFT feature descriptor and a corresponding category.

Figure 4:
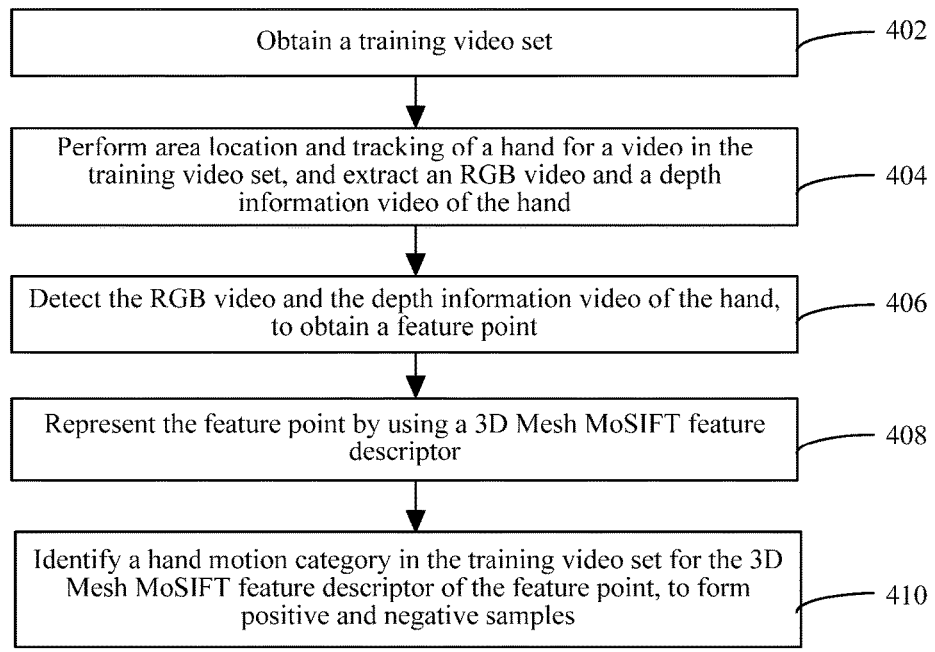
FIG. 4 is a flowchart of performing beforehand training, to obtain a positive sample that includes a 3D Mesh MoSIFT feature descriptor and a corresponding category according to an embodiment.

FIG. 4 is a schematic diagram of performing beforehand training, to obtain positive samples each including a 3D Mesh MoSIFT feature descriptor and a corresponding category according to an embodiment. In FIG. 4, a process of performing beforehand training, to obtain the positive samples each including the 3D Mesh MoSIFT feature descriptor and a corresponding category is mostly consistent with the hand motion identification method, and a difference lies only in that, the training is for obtaining positive and negative samples. As shown in FIG. 4, the performing beforehand training, to obtain the positive sample that includes the 3D Mesh MoSIFT feature descriptor and a corresponding category includes:

Step 402: Obtaining a training video set.

A training video refers to a video having a known hand motion category.

Step 404: Performing area localization and tracking of a hand for a video in the training video set, and extracting an RGB video and a depth information video of the hand.

The performing area localization and tracking of a hand for a video in the training video set, and extracting an RGB video and a depth information video of the hand includes: locating a hand area by using an adaptive window; and tracking the hand area of a current frame by using a minimized energy function in combination with hand state prediction of a previous frame, and extracting the RGB video and the depth information video of the hand.

Specifically, a frame of training video data is first selected, and a hand area of the selected frame of training video data is located by using an adaptive window. Then, the hand area of a current frame is tracked by using a minimized energy function in combination with hand state prediction of a previous frame, and the RGB video and a depth video pair of the hand are extracted.

The minimized energy function is a sum of a data term, a smoothness term, a distance term, a space constraint, a motion constraint, and a Chamfer distance term. A formula of the minimized energy function is as follows:

$$E(\lambda,i)=E_D(\lambda,i)+E_S(\lambda,i)+E_T(\lambda,i)+E_C(\lambda,i)+E_M(\lambda,i)+E_{Ch}(\lambda,i) \quad (1)$$

In the formula (1), $E(\lambda,i)$ is an energy function of an $i^{th}$ frame under parameter $\lambda$, $\lambda$ is an annotation function, $E_D(\lambda,i)$ is the data term, $E_S(\lambda,i)$ is the smoothness term, $E_T(\lambda,i)$ is the distance term, $E_C(\lambda,i)$ is the space constraint, $E_M(\lambda,i)$ is the motion constraint, and $E_{Ch}(\lambda,i)$ is the Chamfer distance term.

Specific description of a data term, a smoothness term, a distance term, a space constraint, a motion constraint, and a Chamfer distance term is similar to the description in the hand motion identification method. Details are not provided again herein.

Step 406: Detecting the RGB video and the depth information video of the hand, to obtain a feature point.

Specifically, the feature point refers to a local extremum of a grayscale change in a video image, and includes all particular structural information of a video. In this embodiment, the feature point can represent a structural feature of the RGB video and the depth information video of the hand.

In an embodiment, step 406 may further include the following.

(1) Converting the RGB video and the depth information video of the hand into grayscale and depth data, and convert the grayscale and depth data into 3D grid data (i.e., 3D mesh data).

(2) Calculating a local density of depth information of vertices within a preset neighborhood in the 3D grid data.

(3) Selecting a vertex corresponding to a maximum value of the local density of the depth information within the preset neighborhood, to be used as a feature point of the preset neighborhood.

Step 408: Representing the feature point by using a 3D Mesh MoSIFT feature descriptor.

In an embodiment, step 408 includes: representing the feature point by using a 3D gradient space descriptor and a 3D motion space descriptor, where the 3D gradient space descriptor includes image gradient descriptors in a horizontal direction and a vertical direction, and the 3D motion space descriptor is a rate descriptor.

Steps for calculating the 3D gradient space descriptor are as follows: first rotating coordinate axes to a direction of the feature point, then projecting the feature point to an xy plane, an xz plane, and a yz plane of 3D space coordinates, separately taking m×m windows by using points formed by projecting the feature point to the xy plane, the xz plane, and the yz plane as centers, calculating, on each r×r block, gradient histograms in 8 directions, evaluating an accumulated value of each gradient direction, to form one seed point, and making up the feature point by using $$\frac{m}{r} \times \frac{m}{r}$$

seed points, where each seed point has vector information of 8 directions, and m and r are both a natural number that is an integer multiple of 2.

The 3D motion space descriptor is a rate descriptor. Components of the rate descriptor on 3D space x-, y-, and z-coordinate axes include: the component of the rate descriptor on the x-axis being a difference between coordinate values of the x-axis to which the feature point is projected on two adjacent frames of videos; the component of the rate descriptor on the y-axis being a difference between coordinate values of the y-axis to which the feature point is projected on two adjacent frames of videos; and the component of the rate descriptor on the z-axis being a difference between coordinate values of the z-axis to which the feature point is projected on depth information of two adjacent frames of videos. Steps 404 to 408 may be repeated for each training video to obtain its corresponding 3D Mesh MoSIFT feature descriptor of its feature point. In some embodiments, the training video set may include videos associated with various hand motion categories performed by different individuals. In the training video set, multiple videos may contain hand gestures performed by a same individual with fixed camera setting.

Step 410: Identifying a hand motion category for each training video in the training video set based on the 3D Mesh MoSIFT feature descriptor of the feature point of the training video, to obtain positive and negative samples.

Specifically, the hand motion category in the training video is identified according to the 3D Mesh MoSIFT feature descriptor; if the hand motion category is the same as a known category, the training video is stored into the positive sample, and if the hand motion category is different from the known category, the training video is stored into the negative sample; and the positive and negative samples both include the 3D Mesh MoSIFT feature descriptor and the corresponding category.

In summary, an RGB video and a depth video pair of a hand are extracted from a video, the RGB video and the depth video pair are detected to obtain a feature point, the feature point is described by using a 3D Mesh MoSIFT feature descriptor, and the feature point is trained to obtain positive and negative samples of a descriptor for determining a hand motion category. The extraction by using the feature point includes depth information, greatly improving the hand identification accuracy, and the feature point can be accurately described by using the 3D Mesh MoSIFT feature descriptor, further improving the hand motion identification accuracy.

Figure 5:
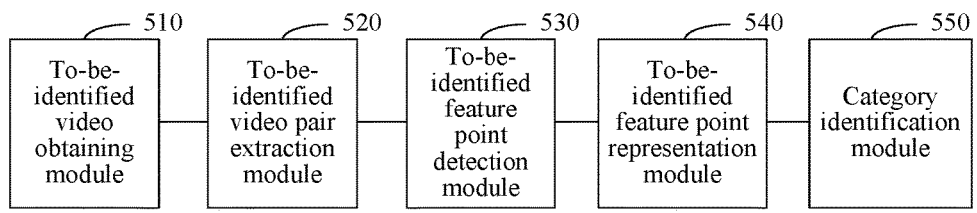
FIG. 5 is a hand motion identification apparatus according to an embodiment.

FIG. 5 is a structural block diagram of a hand motion identification apparatus according to an embodiment. FIG. 5 is a structural block diagram of a hand motion identification apparatus according to an embodiment. As shown in FIG. 5, the hand motion identification apparatus is a functional module that is constructed corresponding to a hand motion identification method. For places in the hand motion identification apparatus that are not described in detail, refer to description of the hand motion identification method. The hand motion identification apparatus may include a to-be-identified video obtaining module 510, a to-be-identified video pair extraction module 520, a to-be-identified feature point detection module 530, a to-be-identified feature point representation module 540, and a category identification module 550.

The to-be-identified video obtaining module 510 may be configured to obtain a to-be-identified video; and specifically, the to-be-identified video may be various collected RGB videos and depth information videos that include human hand motion data.

The to-be-identified video pair extraction module 520 is configured to perform area localization and tracking of a hand for the to-be-identified video, and extract an RGB video and a depth information video of the hand; and specifically, a hand area in each frame of image in the to-be-identified video is located and tracked by using an automatic detector, and then an RGB-D video pair (that is, the RGB video and the depth information video) of the hand is extracted.

The to-be-identified feature point detection module 530 is configured to detect the RGB video and the depth information video of the hand, to obtain a feature point; specifically, the feature point refers to a local extremum of a grayscale change in a video image, and includes all particular structural information of a video; and in this embodiment, the feature point can represent a structural feature of the RGB video and the depth information video of the hand.

The to-be-identified feature point representation module 540 is configured to represent the feature point by using a 3D Mesh MoSIFT feature descriptor; the 3D Mesh MoSIFT feature descriptor is an image local feature description operator that is based on a scale space and keeps image zoom and rotation transformation unchanged; and in this embodiment, the feature point of the RGB-D video pair of the hand is represented by using the 3D Mesh MoSIFT feature descriptor.

The category identification module 550 is configured to compare the 3D Mesh MoSIFT feature descriptor of the feature point with 3D Mesh MoSIFT feature descriptors in positive samples obtained through beforehand training, to obtain a hand motion category in the to-be-identified video.

Specifically, training is performed according to a video of a known hand motion category to obtain positive and negative samples, where the positive sample refers to a sample in which hand motion is correctly identified, and the negative sample refers to a sample in which hand motion is incorrectly identified. The positive sample includes the 3D Mesh MoSIFT feature descriptor and a corresponding hand motion category. The 3D Mesh MoSIFT feature descriptor of the feature point of the RGB-D video pair of the hand in the to-be-identified video is matched with the 3D Mesh MoSIFT feature descriptor in the positive sample, so that the hand motion category in the to-be-identified video may be obtained.

In the foregoing hand motion identification method and apparatus, an RGB video and a depth information video of a hand are extracted from a video, the RGB video and the depth information video are detected to obtain a feature point, the feature point is described by using a 3D Mesh MoSIFT feature descriptor, and the 3D Mesh MoSIFT feature descriptor of the feature point is matched with the 3D Mesh MoSIFT feature descriptor in the positive sample, so that the hand motion category in the to-be-identified video may be obtained. The extraction by using the feature point includes depth information, greatly improving the hand identification accuracy, and the feature point can be accurately described by using the 3D Mesh MoSIFT feature descriptor, further improving the hand motion identification accuracy.

Figure 6:
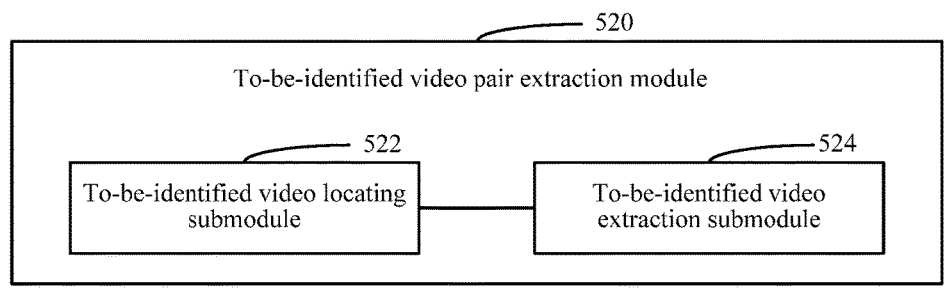
FIG. 6 is a structural block diagram of a to-be-identified video pair extraction module according to an embodiment.

FIG. 6 is an internal structural block diagram of a to-be-identified video pair extraction module according to an embodiment. A to-be-identified video pair extraction module 520 includes a to-be-identified video locating submodule 522 and a to-be-identified video extraction submodule 524. The to-be-identified video locating submodule 522 is configured to locate a hand area by using an adaptive window. The to-be-identified video extraction submodule 524 is configured to track the hand area of a current frame by using a minimized energy function in combination with hand state prediction of a previous frame, and extract the RGB video and the depth information video of the hand.

Specifically, a frame of to-be-identified video data is first selected, and a hand area of the selected frame of to-be-identified video data is located by using an adaptive window. Then, the hand area of a current frame is tracked by using a minimized energy function in combination with hand state prediction of a previous frame, and the RGB video and the depth information video of the hand are extracted.

The minimized energy function is a sum of a data term, a smoothness term, a distance term, a space constraint, a motion constraint, and a Chamfer distance term, where the data term is used to estimate likelihood values of the hand at pixels; the smoothness term is used to estimate that two adjacent pixels are different annotations; the distance term is used to constrain a new state estimation to be within a predicted space domain; the space constraint is used to distinguish adjacent areas of the hand; the motion constraint is used to separate the hand from another portion other than the hand; and the Chamfer distance term is used to distinguish an overlapping area of the hand.

Calculation formulas for a data term, a smoothness term, a distance term, a space constraint, a motion constraint, and a Chamfer distance term are described in the foregoing hand motion identification method. Details are not provided again herein.

Figure 7:
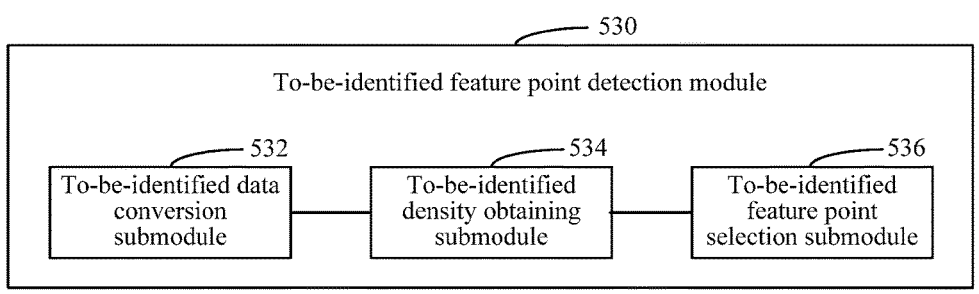
FIG. 7 is an internal structural block diagram of a to-be-identified feature point detection module according to an embodiment.

FIG. 7 is an internal structural block diagram of a to-be-identified feature point detection module according to an embodiment. As shown in FIG. 7, a to-be-identified feature point detection module 530 includes a to-be-identified data conversion submodule 532, a to-be-identified density obtaining submodule 534, and a to-be-identified feature point selection submodule 536. The to-be-identified data conversion submodule 532 is configured to convert the RGB video and the depth information video of the hand into grayscale and depth data, and convert the grayscale and depth data into 3D grid data. The to-be-identified density obtaining submodule 534 is configured to calculate a local density of depth information of vertices within a preset neighborhood in the 3D grid data.

Specifically, grid domain M is formed by using the 3D grid data. A Gauss filter is defined on grid domain M, to obtain grid layer $M^S=(V^S,F)$, where $V^S$ is a vertex at a layer S, and F is a triangular patch.

It is assumed that, for each vertex S at layer $\upsilon_m^s$ (a layer is a scale) of the grid layer, vertex (S+1) of a next layer, that is, $\upsilon_m^{s-1}$, is an average value of all vertices within a first order neighborhood of $\upsilon_m^s$. $\upsilon_m^{s+1}$ may be calculated according to a formula (10):

$$\upsilon_m^{s+1} = \frac{1}{Vn_m^s} \sum_{\upsilon_j^s \in Vn_m^s} \upsilon_j^s \qquad (10)$$

In the formula (10), $Vn_m^s$ is a first order neighborhood set of $\upsilon_m^s$, and $\upsilon_j^s$ is an element in $Vn_m^s$. $D_i$ is defined as the local density of the depth information at vertex $\upsilon_m^s$, and a calculation formula of it is a formula (11):

$$D_i = \frac{1}{|Vn_m^s|} \sum_{\upsilon_j^s \in Vn_m^s} |\upsilon_m^s - \upsilon_j^s| \qquad (11)$$

An initial variance $\sigma_0 = D_i$.

Different of gradient (DOG) function $d_m^s$ is defined as a variance of two Gaussian kernels at different scales, and is calculated according to a formula (12):

$$d_m^2 = \frac{1}{\sigma^2} |\upsilon_m^s - \upsilon_m^{s+1}| \qquad (12)$$

In the formula (12), $\upsilon^2$ is a variance of the Gauss filter at scale S. A target grid sample is uneven, an overall filtration width of the grid layer meets density invariance $\upsilon_s = \sqrt{s}D_m$, and $D_m$ is the local density of the depth information.

A local scale is set to $S_m = C\sqrt{S_m}D_m$, where $S_m$ is a scale parameter, $D_m$ is the local density of the depth information, C is a predefined parameter of a descriptor used to balance locality and robustness.

The to-be-identified feature point selection submodule 536 is configured to select a vertex corresponding to a maximum value of the local density of the depth information within the preset neighborhood, to be used as a feature point of the preset neighborhood.

In this embodiment, the preset neighborhood may include a 6-point neighborhood of this layer, a 6-point neighborhood of an upper layer, and a 6-point neighborhood of a lower layer. That is, a vertex at this layer is used as a center, 6 points are selected at this layer, 6 points are selected at the upper layer, and 6 points are selected at the lower layer, to form a neighborhood of the vertex. A range of the preset neighborhood may be adjusted as required, and is not limited.

In an embodiment, the to-be-identified feature point representation module 540 is configured to represent the feature point by using a 3D gradient space descriptor and a 3D motion space descriptor, where the 3D gradient space descriptor includes image gradient descriptors in a horizontal direction and a vertical direction, and the 3D motion space descriptor is a rate descriptor.

Specifically, to reduce redundancy and improve calculation efficiency, based on 3D Mesh MoSIFT feature descriptors of three separated planes, only a case of co-occurrence is considered. The 3D Mesh MoSIFT feature descriptor of the feature point includes two portions: the 3D gradient space descriptor and the 3D motion space descriptor. The 3D gradient space descriptor includes the image gradient descriptors in the horizontal direction and the vertical direction.

The 3D gradient space descriptor is obtained through a calculation in the manner in FIG. 3. The 3D gradient space descriptor is calculated as follows: the to-be-identified feature point representation module 540 is further configured to rotate coordinate axes to a direction of the feature point, then project the feature point to an xy plane, an xz plane, and a yz plane of 3D space coordinates, separately take m xm windows by using points formed by projecting the feature point to the xy plane, the xz plane, and the yz plane as centers, calculate, on each r×r block, gradient histograms in 8 directions, evaluate an accumulated value of each gradient direction, to form one seed point, and make up the feature point by using $$\frac{m}{r} \times \frac{m}{r}$$

seed points, where each seed point has vector information of 8 directions, and m and r are both a natural number that is an integer multiple of 2.

In this embodiment, 16×16 windows (for example, the left portion in FIG. 3) are separately taken by using points formed by projecting the feature point to the xy plane, the xz plane, and the yz plane as centers, where each window represents one pixel of a scale space in which a neighborhood of the feature point is located, and an arrow direction represents a gradient direction of this pixel, and an arrow length represents a gradient modulus value. Then, gradient direction histograms in 8 directions are calculated on each 4×4 block, then an accumulated value of each gradient direction is drawn, and then a seed point may be formed, as shown in the right portion in FIG. 3. One feature point in FIG. 3 consists of 4×4, that is, a total of 16, seed points, where each seed point has vector information of the 8 directions. 128 data may be generated by describing the feature point by using 16 seed points, finally forming a 3D Mesh MoSIFT feature vector with 128 dimensions, which has higher accuracy. In another embodiment, a size of a window taken by using points formed by projecting the feature point to the xy plane, the xz plane, and the yz plane as centers may be 8×8, and then one feature point consists of 2×2, that is, a total of 4 seed points, where each seed point has vector information of the 8 directions.

Image gradients in the horizontal direction and the vertical direction are calculated according to a formula (13):

$$I_x = \nabla_x(I) = \frac{\partial I}{\partial x}, \qquad (13)$$
$$I_y = \nabla_y(I) = \frac{\partial I}{\partial y},$$
$$D_z^x = \nabla_x(D) = \frac{\partial D}{\partial x},$$

-continued $$D_z^y = \nabla_y(D) = \frac{\partial D}{\partial y}$$

In the formula (13), $$\frac{\partial D}{\partial x}$$

and $$\frac{\partial D}{\partial y}$$

are respectively gradients in an x direction (the horizontal direction) and a y direction (the vertical direction).

The 3D motion space descriptor is a rate descriptor. Components of the rate descriptor on 3D space x-, y-, and z-coordinate axes include: the component of the rate descriptor on the x-axis being a difference between coordinate values of the x-axis to which the feature point is projected on two adjacent frames of videos; the component of the rate descriptor on the y-axis being a difference between coordinate values of the y-axis to which the feature point is projected on two adjacent frames of videos; and the component of the rate descriptor on the z-axis being a difference between coordinate values of the z-axis to which the feature point is projected on depth information of two adjacent frames of videos.

Specifically, feature point $p_i$ at time point moment is detected, point $p_{i+1}$ may be predicted by using RGB data, and then corresponding $p_i^d$ and $p_{i+1}^d$ are determined in depth image D in the depth information video. A formula for calculating rates in different directions is a formula (14):

$$V_x = I_x(p_{i+1}) - I_x(p_i),\ V_y = I_y(p_{i+1}) - I_y(p_i),\ V_z = D(p_{i+1}) - D(p_i) \quad (14)$$

The foregoing represents the feature point by using the 3D Mesh MoSIFT feature descriptor, so that a motion surface result may be better reflected and more distinguishing information may be stored; and the 3D Mesh MoSIFT feature descriptor forms a mesh surface on three orthogonal planes of the xy plane, the xz plane, and the yz plane, and a connection feature vector is shorter, effectively improving information representation of a hand fine motion.

Figure 8:
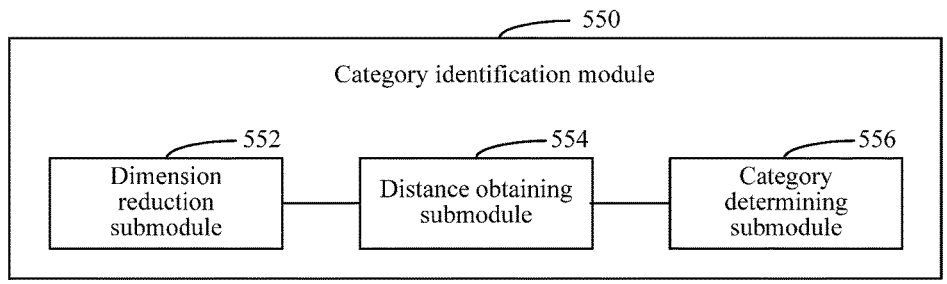
FIG. 8 is an internal structural block diagram of a category identification module according to an embodiment.

FIG. 8 is an internal structural block diagram of a category identification module according to an embodiment. As shown in FIG. 8, a category identification module 550 includes a dimension reduction submodule 552, a distance obtaining submodule 554, and a category determining submodule 556, where: the dimension reduction submodule 552 is configured to dimensionally reduce the 3D Mesh MoSIFT feature descriptor of the feature point to a dimension that is the same as that of the 3D Mesh MoSIFT feature descriptor in the positive sample obtained through the beforehand training.

Specifically, it is assumed that $Y = [y_1, y_2, \ldots, y_n] \in R^{D \times N}$ is a group of descriptors of D dimensions that are extracted from a training video, for constructing a visual code book $B = [b_1, b_2, \ldots, b_M] \in R^{D \times M}$. Sparse table Y is provided for $C = [c_1, c_2, \ldots, c_N]$, where $c_i \in R^M$, and each $c_i$ includes k (k□ M) or fewer non-zero elements. An optimization function is defined according to a formula (15):

$$\min_c \|Y - BC\|_F^2, \quad (15)$$

s.t.

$$\|c_i\|_0 \leq k,\ \forall_i$$

In the formula (15), $\|.\|_F$ is a Forbenius norm, and $\|.\|_0$ is an $l_0$ norm, used to calculate the number of non-zero elements. The 3D Mesh MoSIFT feature descriptor of the feature point is dimensionally reduced, by using the formula (15), to a dimension that is the same as that of the 3D Mesh MoSIFT feature descriptor in the positive sample obtained through the beforehand training.

For sparse coefficient $c_i \in C$ of a vector of a descriptor related to the hand motion category, each sparse coefficient is represented by using a coefficient histogram, and the formula is a formula (16):

$$h_j = \frac{1}{N} \sum_{i=1}^{N} c_i \quad (16)$$

In the formula (16), $c_i \in C$ is a descriptor of the $i^{th}$ frame of $C \in M \times N$, where N is a total quantity of $h_j \in M$ descriptors. Each visual code may be described by using the coefficient histogram, and visual code of a hand motion in a video may be visually determined and identified according to the coefficient histogram, thereby obtaining a result of a hand motion category.

The distance obtaining submodule 554 is configured to evaluate a Euclidean distance between the 3D Mesh MoSIFT feature descriptor of the feature point after the dimension reduction and the 3D Mesh MoSIFT feature descriptor in the positive sample.

The category determining submodule 556 is configured to select a category corresponding to the 3D Mesh MoSIFT feature descriptor in the positive sample with a minimum Euclidean distance to the 3D Mesh MoSIFT feature descriptor of the feature point, to be used as the hand motion category in the to-be-identified video.

In the foregoing, the 3D Mesh MoSIFT feature descriptor of the feature point is dimensionally reduced, to reach a dimension of the 3D Mesh MoSIFT feature descriptor obtained through the beforehand training, and then comparison and matching are performed, which is more accurate.

Figure 9:
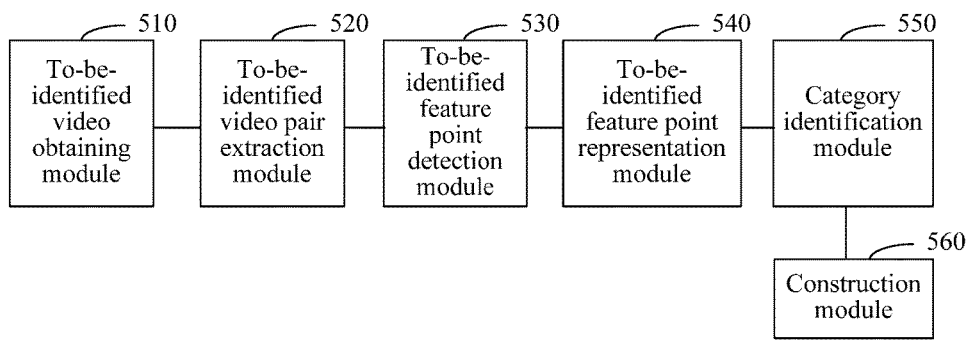
FIG. 9 is a structural block diagram of a hand motion identification apparatus according to another embodiment.

FIG. 9 is a structural block diagram of a hand motion identification apparatus according to another embodiment. As shown in FIG. 9, besides a to-be-identified video obtaining module 510, a to-be-identified video pair extraction module 520, a to-be-identified feature point detection module 530, a to-be-identified feature point representation module 540, and a category identification module 550, the hand motion identification apparatus further includes a construction module 560. The construction module 560 is configured to perform beforehand training, to obtain the positive sample that includes the 3D Mesh MoSIFT feature descriptor and a corresponding category.

Figure 10:
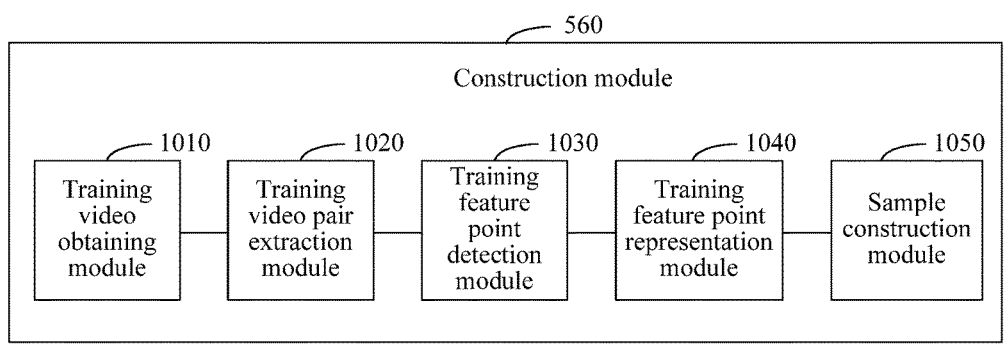
FIG. 10 is an internal structural block diagram of a construction module according to an embodiment.

FIG. 10 is an internal structural block diagram of a construction module according to an embodiment. As shown in FIG. 10, the construction module 560 includes a training video obtaining module 1010, a training video pair extraction module 1020, a training feature point detection module 1030, a training feature point representation module 1040, and a sample construction module 1050, where: the training video obtaining module 1010 is used to obtain a training video set; the training video pair extraction module 1020 is configured to perform area-locating and tracking of a hand for a video in the training video set, and extract an RGB video and a depth information video of the hand; the training feature point detection module 1030 is configured to detect the RGB video and the depth information video of the hand, to obtain a feature point; the training feature point representation module 1040 is configured to represent the feature point by using a 3D Mesh MoSIFT feature descriptor; and the sample construction module 1050 is configured to identify a hand motion category in the training video set for the 3D Mesh MoSIFT feature descriptor of the feature point, to form positive and negative samples.

In the foregoing hand motion identification apparatus, an RGB video and a depth video pair of a hand are extracted from a video, the RGB video and the depth video pair are detected to obtain a feature point, the feature point is described by using a 3D Mesh MoSIFT feature descriptor, and the feature point is trained to obtain positive and negative samples of a descriptor for determining a hand motion category. The extraction by using the feature point includes depth information, greatly improving the hand identification accuracy, and the feature point can be accurately described by using the 3D Mesh MoSIFT feature descriptor, further improving the hand motion identification accuracy.

Figure 11:
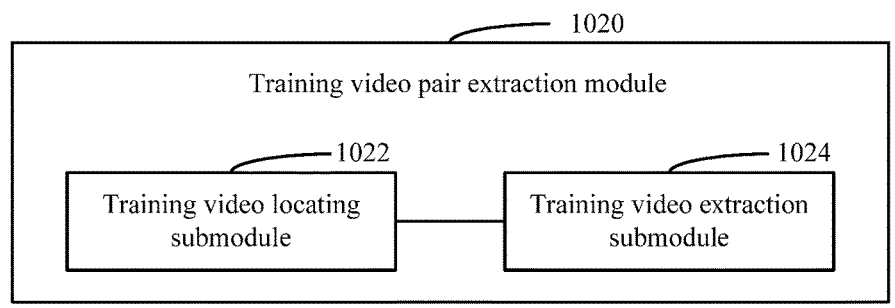
FIG. 11 is an internal structural block diagram of a training video pair extraction module according to an embodiment.

FIG. 11 is an internal structural block diagram of a training video pair extraction module according to an embodiment. The training video pair extraction module 1020 includes a training video locating submodule 1022 and a training video extraction submodule 1024, where: the training video locating submodule 1022 is configured to locate a hand area by using an adaptive window; and the training video extraction submodule 1024 is configured to track the hand area of a current frame by using a minimized energy function in combination with hand state prediction of a previous frame, and extract the RGB video and the depth information video of the hand.

Specifically, a frame of training video data is first selected, and a hand area of the selected frame of training video data is located by using an adaptive window. Then, the hand area of a current frame is tracked by using a minimized energy function in combination with hand state prediction of a previous frame, and the RGB video and the depth information video of the hand are extracted.

The minimized energy function is a sum of a data term, a smoothness term, a distance term, a space constraint, a motion constraint, and a Chamfer distance term, where the data term is used to estimate likelihood values of the hand at pixels; the smoothness term is used to estimate smoothness of two adjacent pixels; the distance term is used to constrain a new state estimation to be within a predicted space domain; the space constraint is used to distinguish adjacent areas of the hand; the motion constraint is used to separate the hand from another portion other than the hand; and the Chamfer distance term is used to distinguish an overlapping area of the hand. Specific definitions for a data term, a smoothness term, a distance term, a space constraint, a motion constraint, and a Chamfer distance term are described in the hand motion identification method. Details are not provided again herein.

Figure 12:
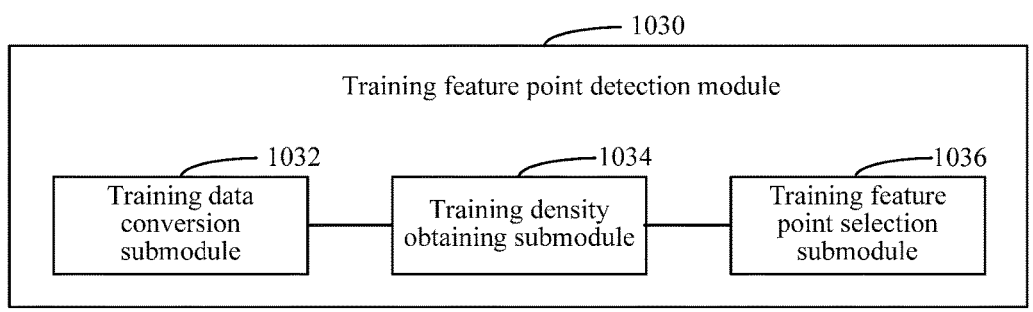
FIG. 12 is an internal structural block diagram of a training feature point detection module according to an embodiment.

FIG. 12 is an internal structural block diagram of a training feature point detection module according to an embodiment. As shown in FIG. 12, the training feature point detection module 1030 includes a training data conversion submodule 1032, a training density obtaining submodule 1034, and a training feature point selection submodule 1036, where: the training data conversion submodule 1032 is configured to convert the RGB video and the depth information video of the hand into grayscale and depth data, and convert the grayscale and depth data into 3D grid data; the training density obtaining submodule 1034 is configured to calculate a local density of depth information of vertices within a preset neighborhood in the 3D grid data; and the training feature point selection submodule 1036 is configured to select a vertex corresponding to a maximum value of the local density of the depth information within the preset neighborhood, to be used as a feature point of the preset neighborhood.

In an embodiment, the training feature point representation module 1040 is configured to represent the feature point by using a 3D gradient space descriptor and a 3D motion space descriptor, where the 3D gradient space descriptor includes image gradient descriptors in a horizontal direction and a vertical direction, and the 3D motion space descriptor is a rate descriptor.

Specifically, the 3D Mesh MoSIFT feature descriptor of the feature point includes two portions: the 3D gradient space descriptor and the 3D motion space descriptor. The 3D gradient space descriptor includes the image gradient descriptors in the horizontal direction and the vertical direction. The 3D gradient space descriptor is calculated as follows: the to-be-identified feature point representation module 540 is further configured to rotate coordinate axes to a direction of the feature point, then project the feature point to an xy plane, an xz plane, and a yz plane of 3D space coordinates, separately take m×m windows by using points formed by projecting the feature point to the xy plane, the xz plane, and the yz plane as centers, calculate, on each r×r block, gradient histograms in 8 directions, evaluate an accumulated value of each gradient direction, to form one seed point, and make up the feature point by using $$\frac{m}{r} \times \frac{m}{r}$$

seed points, where each seed point has vector information of 8 directions, and m and r are both a natural number that is an integer multiple of 2.

In this embodiment, 16×16 windows (for example, the left portion in FIG. 3) are separately taken by using points formed by projecting the feature point to the xy plane, the xz plane, and the yz plane as centers, where each window represents one pixel of a scale space in which a neighborhood of the feature point is located, and an arrow direction represents a gradient direction of this pixel, and an arrow length represents a gradient modulus value. Then, gradient direction histograms in 8 directions are calculated on each 4×4 block, then an accumulated value of each gradient direction is drawn, and then a seed point may be formed, as shown in the right portion in FIG. 3. One feature point in FIG. 3 consists of 4×4, that is, a total of 16, seed points, where each seed point has vector information of the 8 directions. 128 data may be generated by describing the feature point by using 16 seed points, finally forming a 3D Mesh MoSIFT feature vector with 128 dimensions, which has higher accuracy. In another embodiment, a size of a window taken by using points formed by projecting the feature point to the xy plane, the xz plane, and the yz plane as centers may be 8×8, and then one feature point consists of 2×2, that is, a total of 4 seed points, where each seed point has vector information of the 8 directions.

Image gradients in the horizontal direction and the vertical direction are calculated according to a formula (13):

$$I_x = \nabla_x(I) = \frac{\partial I}{\partial x},$$
$$I_y = \nabla_y(I) = \frac{\partial I}{\partial y},$$
$$D_z^x = \nabla_x(D) = \frac{\partial D}{\partial x},$$
$$D_z^y = \nabla_y(D) = \frac{\partial D}{\partial y}$$

(13)

In the formula (13), $$\frac{\partial D}{\partial x}$$

and $$\frac{\partial D}{\partial y}$$

are respectively gradients in an x direction (the horizontal direction) and a Y direction (the vertical direction).

The 3D motion space descriptor is a rate descriptor. Components of the rate descriptor on 3D space x-, y-, and z-coordinate axes include: the component of the rate descriptor on the x-axis being a difference between coordinate values of the x-axis to which the feature point is projected on two adjacent frames of videos; the component of the rate descriptor on the y-axis being a difference between coordinate values of the y-axis to which the feature point is projected on two adjacent frames of videos; and the component of the rate descriptor on the z-axis being a difference between coordinate values of the z-axis to which the feature point is projected on depth information of two adjacent frames of videos.

Specifically, feature point $p_i$ at time point moment is detected, point $p_{i+1}$ may be predicted by using RGB data, and then corresponding $p_i^d$ and $p_{i+1}^d$ are determined in depth image D in the depth information video. A formula for calculating rates in different directions is a formula (14):

$$V_x = I_x(p_{i+1}) - I_x(p_i), \ V_y = I_y(p_{i+1}) - I_y(p_i), \ V_z = D(p_{i+1}) - D(p_i)$$

(14)

The foregoing represents the feature point by using the 3D Mesh MoSIFT feature descriptor, so that a motion surface result may be better reflected and more discrimination information may be stored; and the 3D Mesh MoSIFT feature descriptor forms a mesh surface on three orthogonal planes of the xy plane, the xz plane, and the yz plane, and a connection feature vector is shorter, effectively improving information representation of a hand fine motion.

Figure 13:
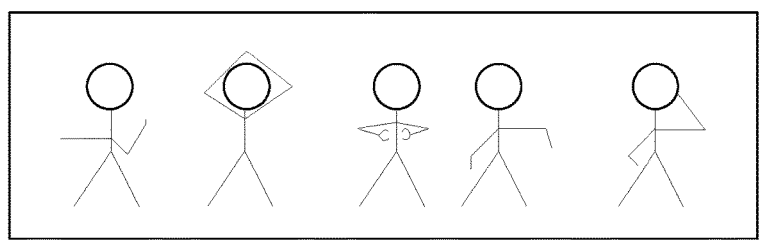
FIG. 13 illustrates some examples of a ChaLearn database.

An experiment in which the foregoing hand motion identification method and apparatus are applied to identify a video is as follows: based on two RGB-D (RGB-depth information) video databases. Data in a first video database is data obtained from a ChaLearn posture database, and includes 20 branches. Each branch indicates a same individual, and consists of 100 recorded postures, where grouping sequence numbers of the 100 postures are 1 to 5. A ChaLearn commonality database is configured to estimate different feature descriptors that are based on the RGB and depth videos. FIG. 13 provides some examples of a ChaLearn database. Data in a second video database consists of 9100 RGB-D video pairs, and is collected by using a Kinect camera with a 640*480 image size. Human behaviors include 8 categories of hand motions, including gestures of 5 males and 2 females from different countries, such as different direction points, applause, waving, fisting, counting from one to five, thumbs up, V sign for victory, and capture.

A ChaLearn posture data set is used to estimate performance of the foregoing hand motion identification method. A similarity algorithm is introduced to calculate a distance between a predicted category and a real category. In some embodiments, mean Levenshtein distance may be computed to obtain a score between predicted categories and truth categories of all videos. The Levenshtein distance may refer to a minimum number of operations (insertions, substitutes or deletions). Features considered by the similarity algorithm include a Cuboid(R) feature of the RGB video, Cuboid (R+D) features of the RGB and depth videos, a stip hog(R) feature of the RGB video, stip hog(R+D) features of the RGB and depth videos, a stip hof(R) feature of the RGB video, stip hof(R+D) features of the RGB and depth videos, a stip hoghof(R) feature of the RGB video, stip hoghof(R+D) features [28] of the RGB and depth videos, MoSIFT(R) [30] of the RGB video, MoSIFT(R+D) of the RGB and depth videos, and 3D MoSIFT and 3D Mesh MoSIFT of the RGB and depth videos.

Table 1 shows mean Levenshtein distance score by different feature descriptors with different codebook sizes. The foregoing 3D Mesh MoSIFT feature descriptor has a similarity mean score that is higher than that of another feature descriptor. In other words, the mean Levenshtein distance score of the disclosed descriptor is lower than other feature descriptors, as shown in Table 1, meaning more accurately predicted categories with disclosed method.

TABLE 1

| Method | 0.1 | 0.2 | 0.3 | 0.4 | 0.5 |
|---|---|---|---|---|---|
| Cuboid | 0.367 | 0.365 | 0.343 | 0.331 | 0.314 |
| Cuboid(R + D) | 0.337 | 0.316 | 0.309 | 0.308 | 0.218 |
| Stip hog | 0.301 | 0.260 | 0.250 | 0.236 | 0.235 |
| Stip hog(R + D) | 0.249 | 0.228 | 0.224 | 0.228 | 0.227 |
| Stip hof | 0.348 | 0.327 | 0.313 | 0.299 | 0.291 |
| Stip hof(R + D) | 0.322 | 0.292 | 0.285 | 0.279 | 0.271 |
| Stip hoghof | 0.242 | 0.219 | 0.200 | 0.195 | 0.185 |
| Stip hoghof(R + D) | 0.210 | 0.188 | 0.183 | 0.187 | 0.182 |
| MoSIFT | 0.417 | 0.396 | 0.359 | 0.366 | 0.335 |
| MoSIFT(R + D) | 0.444 | 0.443 | 0.436 | 0.423 | 0.405 |
| 3D MoSIFT | 0.191 | 0.167 | 0.162 | 0.145 | 0.146 |
| 3D Mesh MoSIFT | 0.154 | 0.147 | 0.142 | 0.134 | 0.131 |

It can be known from Table 1 that, 1) a shape and a geometrical change play a critical role in an aspect of the fine motion identification accuracy, and a distance error can be conspicuously reduced by adding depth information; 2) the foregoing hand motion identification method can accurately capture a change of a motion, and the depth and texture of a hand motion; and 3) the used 3D Mesh MoSIFT feature descriptor can better represent a human behavior than another algorithm can, and the 3D Mesh MoSIFT feature descriptor displays invariance within space and time domains.

A hidden Markov model (HMM) training method, a Latent Dirichlet Allocation (LDA) model training method, and a training method of the foregoing hand motion identification modeling method are compared, and the comparison result is shown in Table 2.

TABLE 2

| Distance | HMM model | LDA model | SOMP |
| --- | --- | --- | --- |
| 1 meter | 35.82% | 36.02% | 45.29% |
| 2 meters | 41.9% | 37.92% | 51.03% |
| 3 meters | 36.0% | 35.23% | 46.17% |
| 4 meters | 33.73% | 34.19% | 40.02% |

In the foregoing comparison, the selected database is captured by using the Kinect camera, and includes data of single-hand and both-hand behaviors that are 1 meter to 4 meters from the camera. Performance of the 3D Mesh MoSIFT under different distances is compared, thereby reaching a result that the accuracy is obviously high for identifying the hand motion from 2 meters to 3 meters, which is mainly because: firstly, the Kinect has a best shooting range (1.8 meters to 3 meters), where in this range, a high-quality depth video can be obtained; and secondly, a sensitivity range of the depth information is 2 meters to 3 meters.

For the comparison between the performance of the different training methods, a higher F1 score indicates a more accurate identification result. The HMM model method is sensitive to the number of feature points; when feature points obtained from a video are relatively sufficient, the HMM model is better than the LDA model; and when the feature points are relatively scarce, the HMM model cannot be completely trained, and a result worse than that of the LDA model is obtained. It can be known according to statistical data in the database that, under a condition of 1 meter, if a person is too close to the Kinect camera, a blind spot exists, and the camera cannot capture all moving portions of the depth video; and under a condition of 4 meters, due to an effect of light, there are very few feature points. However, under a condition of 2 meters to 3 meters, a large quantity of feature points can be obtained, and therefore the identification accuracy obviously increases.

A result of an experiment based on different face orientations and hands is shown in Table 3.

TABLE 3

| Result | Left hand | Right hand | Both hands |
| --- | --- | --- | --- |
| Forward | 52.15% | 51.97% | 56.83% |
| Broadside | 43.91% | 43.10% | 47.89% |
| Backward | 55.62% | 54.99% | 59.76% |

It can be known from Table 3 that, 1) in forward and backward cases, the 3D Mesh MoSIFT can effectively integrate depth and visual information to make the F1 score increase; 2) a large quantity of noises appear at an outer edge of the depth video, causing the identification performance to be poor; 3) the identification result obtained by using the left hand or the right hand is roughly similar, and the identification result obtained by the both hands is obviously improved, because the number of feature points that are extracted by the 3D Mesh MoSIFT and collected by using the both hands is larger than that by using a single hand; and 4) a size of a training set also affects the identification performance.

The foregoing embodiments only describe several implementation manners of the present disclosure, and their description is specific and detailed, but cannot therefore be understood as a limitation to a patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A hand motion identification method, comprising:
a computing device having one or more processors and a memory storing programs executed by the one or more processors;
obtaining a to-be-identified video;
performing area localization and tracking of a hand for the to-be-identified video;
extracting a red-green-blue (RGB) video and a depth information video of the located and tracked hand;
detecting the RGB video and the depth information video of the hand to obtain a feature point;
representing, by using a 3D Mesh motion scale-invariant feature transform (MoSIFT) feature descriptor, the feature point; and
comparing the 3D Mesh MoSIFT feature descriptor of the feature point with 3D Mesh MoSIFT feature descriptors in positive samples obtained through beforehand training, to obtain a hand motion category in the to-be-identified video,
wherein comparing the 3D Mesh MoSIFT feature descriptor of the feature point with 3D Mesh MoSIFT feature descriptors in positive samples obtained through beforehand training, to obtain a hand motion category in the to-be-identified video comprises:
dimensionally reducing the 3D Mesh MoSIFT feature descriptor of the feature point to a dimension that is the same as that of a 3D Mesh MoSIFT feature descriptor in a positive sample obtained through the beforehand training;
evaluating a Euclidean distance between the 3D Mesh MoSIFT feature descriptor of the feature point after the dimension reduction and the 3D Mesh MoSIFT feature descriptor in the positive sample; and
selecting a category corresponding to the 3D Mesh MoSIFT feature descriptor in one of the positive samples with a minimum Euclidean distance to the 3D Mesh MoSIFT feature descriptor of the feature point, to be used as the hand motion category in the to-be-identified video.

2. The method according to claim 1, wherein performing area localization and tracking of a hand for the to-be-identified video, and extracting an RGB video and a depth information video of the hand comprises:
locating a hand area by using an adaptive window; and
tracking the hand area of a current frame by using a minimized energy function in combination with hand state prediction of a previous frame to extract the RGB video and the depth information video of the hand.

3. The method according to claim 2, wherein the minimized energy function is a sum of a data term, a smoothness term, a distance term, a space constraint, a motion constraint, and a Chamfer distance term, wherein the data term is used to estimate likelihood values of pixels associated with the hand; the smoothness term is used to estimate smoothness of two adjacent pixels; the distance term is used to constrain a new state estimation to be within a predicted space domain; the space constraint is used to distinguish a color-similar area of the hand; the motion constraint is used to separate the hand from another portion other than the hand; and the Chamfer distance term is used to distinguish an overlapping area of the hand.

4. The method according to claim 1, wherein detecting the RGB video and the depth information video of the hand, to obtain a feature point comprises:
converting the RGB video and the depth information video of the hand into grayscale and depth data, and converting the grayscale and depth data into 3D grid data;
calculating a local density of depth information of vertices within a preset neighborhood in the 3D grid data; and
selecting a vertex corresponding to a maximum value of the local density of the depth information within the preset neighborhood, to be used as a feature point of the preset neighborhood.

5. The method according to claim 1, wherein representing the feature point by using a 3D Mesh MoSIFT feature descriptor comprises:
representing the feature point by using a 3D gradient space descriptor and a 3D motion space descriptor, wherein the 3D gradient space descriptor comprises image gradient descriptors in a horizontal direction and a vertical direction, and the 3D motion space descriptor comprises a rate descriptor.

6. The method according to claim 5, wherein a step of calculating the image gradient descriptors in the horizontal direction and the vertical direction comprises:
rotating coordinate axes to a direction of the feature point, projecting the feature point to an xy plane, an xz plane, and a yz plane of 3D space coordinates, separately taking m×m windows by using points formed by projecting the feature point to the xy plane, the xz plane, and the yz plane as centers, calculating, on each r×r block, gradient histograms in 8 directions, evaluating an accumulated value of each gradient direction, to form one seed point, and making up the feature point by using $$\frac{m}{r} \times \frac{m}{r}$$

seed points, wherein each seed point has vector information of 8 directions, m and r are both a natural number that is an integral multiple of 2, and m is greater than r.

7. The method according to claim 5, wherein components of the rate descriptor on 3D space x-, y-, and z-coordinate axes comprise:
a component of the rate descriptor on the x-axis being a difference between coordinate values of the x-axis to which the feature point is projected on two adjacent frames of videos;
a component of the rate descriptor on the y-axis being a difference between coordinate values of the y-axis to which the feature point is projected on two adjacent frames of videos; and
a component of the rate descriptor on the z-axis being a difference between coordinate values of the z-axis to which the feature point is projected on depth information of two adjacent frames of videos.

8. The method according to claim 1, wherein the method further comprises:
performing beforehand training, to obtain the positive samples each comprising a 3D Mesh MoSIFT feature descriptor and a corresponding category.

9. A hand motion identification apparatus, comprising:
a memory; and
a processor coupled to the memory and configured to:
obtain a to-be-identified video;
perform area localization and tracking of a hand for the to-be-identified video, and extract a red-green-blue (RGB) video and a depth information video of the hand;
detect the RGB video and the depth information video of the hand, to obtain a feature point;
represent the feature point by using a 3D Mesh motion scale-invariant feature transform (MoSIFT) feature descriptor; more description and
compare the 3D Mesh MoSIFT feature descriptor of the feature point with a 3D Mesh MoSIFT feature descriptor in a positive sample obtained through beforehand training, to obtain a hand motion category in the to-be-identified video, including:
dimensionally reducing the 3D Mesh MoSIFT feature descriptor of the feature point to a dimension that is the same as that of a 3D Mesh MoSIFT feature descriptor in a positive sample obtained through the beforehand training;
evaluating a Euclidean distance between the 3D Mesh MoSIFT feature descriptor of the feature point after the dimension reduction and the 3D Mesh MoSIFT feature descriptor in the positive sample; and
selecting a category corresponding to the 3D Mesh MoSIFT feature descriptor in one of the positive samples with a minimum Euclidean distance to the 3D Mesh MoSIFT feature descriptor of the feature point, to be used as the hand motion category in the to-be-identified video.

10. The apparatus according to claim 9, wherein the processor is further configured to:
locate a hand area by using an adaptive window; and
track the hand area of a current frame by using a minimized energy function in combination with hand state prediction of a previous frame to extract the RGB video and the depth information video of the hand.

11. The apparatus according to claim 10, wherein the minimized energy function is a sum of a data term, a smoothness term, a distance term, a space constraint, a motion constraint, and a Chamfer distance term, wherein the data term is used to estimate likelihood values of pixels associated with the hand; the smoothness term is used to estimate smoothness of two adjacent pixels; the distance term is used to constrain a new state estimation to be within a predicted space domain; the space constraint is used to distinguish a color-similar area of the hand; the motion constraint is used to separate the hand from another portion other than the hand; and the Chamfer distance term is used to distinguish an overlapping area of the hand.

12. The apparatus according to claim 9, wherein the processor is further configured to:
convert the RGB video and the depth information video of the hand into grayscale data, and convert the grayscale data into 3D grid data;
calculate a local density of depth information of vertices within a preset neighborhood in the 3D grid data; and
select a vertex corresponding to a maximum value of the local density of the depth information within the preset neighborhood, to be used as a feature point of the preset neighborhood.

13. The apparatus according to claim 9, wherein the processor is further configured to represent the feature point by using a 3D gradient space descriptor and a 3D motion space descriptor, wherein the 3D gradient space descriptor comprises image gradient descriptors in a horizontal direction and a vertical direction, and the 3D motion space descriptor comprises a rate descriptor.

14. The apparatus according to claim 13, wherein the processor is further configured to rotate coordinate axes to a direction of the feature point, project the feature point to an xy plane, an xz plane, and a yz plane of 3D space coordinates, separately take m×m windows by using points formed by projecting the feature point to the xy plane, the xz plane, and the yz plane as centers, calculate, on each r×r block, gradient histograms in 8 directions, evaluate an accumulated value of each gradient direction, to form one seed point, and make up the feature point by using $$\frac{m}{r} \times \frac{m}{r}$$

seed points, wherein each seed point has vector information of 8 directions, and m and r are both a natural number that is an integral multiple of 2.

15. The apparatus according to claim 13, wherein components of the rate descriptor on 3D space x-, y-, and z-coordinate axes comprise:

a component of the rate descriptor on the x-axis being a difference between coordinate values of the x-axis to which the feature point is projected on two adjacent frames of videos;

a component of the rate descriptor on the y-axis being a difference between coordinate values of the y-axis to which the feature point is projected on two adjacent frames of videos; and a component of the rate descriptor on the z-axis being a difference between coordinate values of the z-axis to which the feature point is projected on depth information of two adjacent frames of videos.

16. The apparatus according to claim 9, wherein the processor is further configured to:

perform beforehand training, to obtain the positive samples each comprising a 3D Mesh MoSIFT feature descriptor and a corresponding category.

17. The method according to claim 1, wherein the 3D MoSIFT feature descriptor is an image local feature description operator that is based on a scale space and keeps image zoom and rotation transformation unchanged.

18. The apparatus according to claim 10, wherein the 3D MoSIFT feature descriptor is an image local feature description operator that is based on a scale space and keeps image zoom and rotation transformation unchanged.

\* \* \* \* \*